US012619817B1

(12) United States Patent
McNeill

(10) Patent No.: US 12,619,817 B1
(45) Date of Patent: May 5, 2026

(54) DOCUMENT TEMPLATE GENERATION

(71) Applicant: DocuSign, Inc., San Francisco, CA (US)

(72) Inventor: Erin Lindsay McNeill, London (GB)

(73) Assignee: DOCUSIGN, INC., San Francisco, CA (US)

( * ) Notice: Subject to any disclaimer, the term of this patent is extended or adjusted under 35 U.S.C. 154(b) by 272 days.

(21) Appl. No.: 18/141,096

(22) Filed: Apr. 28, 2023

(51) Int. Cl.
*G06F 40/186* (2020.01)
*G06F 16/93* (2019.01)

(52) U.S. Cl.
CPC ............ *G06F 40/186* (2020.01); *G06F 16/93* (2019.01)

(58) Field of Classification Search
None
See application file for complete search history.

(56) References Cited

U.S. PATENT DOCUMENTS

| | | | |
|---|---|---|---|
| 8,949,706 B2 | 2/2015 | McCabe et al. | |
| 9,292,876 B1 | 3/2016 | Shimkus | |
| 11,341,324 B2 | 5/2022 | Nam et al. | |
| 11,604,839 B2 | 3/2023 | Ashlock et al. | |
| 11,645,446 B1 | 5/2023 | Parish et al. | |
| 2006/0242549 A1* | 10/2006 | Schwier | G06F 3/1288 |
| | | | 715/201 |
| 2009/0092320 A1* | 4/2009 | Berard | G06V 30/40 |
| | | | 382/209 |
| 2021/0149992 A1* | 5/2021 | Nam | G06F 40/169 |
| 2021/0150338 A1* | 5/2021 | Semenov | G06N 3/045 |
| 2021/0349885 A1 | 11/2021 | Wald et al. | |
| 2023/0139036 A1 | 5/2023 | Hamlin | |

OTHER PUBLICATIONS

DocuSign, "DocuSign CLM Document Generation", Jan. 13, 2023, 58 pp., URL: https://support.docusign.com/s/document-item?language=en_US&rsc_301=&bundleId=uqj1643324072491&topicId=rsb1576795539656.html&_LANG=enus.
IBM, "Seal Contract Discovery and Analytics helps businesses gain visibility, control, mitigate risk, and manage their legacy contracts and agreements", IBM Europe, Dec. 10, 2013, 9 pp., URL: https://www.IBM.com/docs/en/announcement_archive/ENUSZP13-0564/ENUSZP13-0564.PDF.
U.S. Appl. No. 17/077,551, filed Oct. 22, 2022, naming inventors McCabe et al.

(Continued)

*Primary Examiner* — Quynh H Nguyen
(74) *Attorney, Agent, or Firm* — Shumaker & Sieffert, P.A.

(57) ABSTRACT
Techniques are disclosed for using a machine learning model to generate document templates from input templates. For example, a computing system receives an input document. A machine learning model of the computing system processes the input document to identify one or more text items corresponding to respective variable field types of the plurality of variable field types. The computing system creates, for each text item of the one or more text items, a variable field for the variable field type of the plurality of variable field types corresponding to the text item and creates, for each variable field of the one or more created variable fields, a mapping for the variable field to a corresponding data source. The computing system generates, based on the input document, a document template comprising the one or more created variable fields and the respective one or more mappings.

20 Claims, 7 Drawing Sheets

(56)               References Cited

OTHER PUBLICATIONS

U.S. Appl. No. 17/710,707, filed Mar. 31, 2022, naming inventors Makram.
U.S. Appl. No. 17/710,711, filed Mar. 31, 2022, naming inventors Jian.
U.S. Appl. No. 17/829,293, filed May 31, 2022, naming inventors Hegardh.
U.S. Appl. No. 17/846,784, filed Jun. 22, 2022, naming inventors Parish et al
U.S. Appl. No. 17/956,448, filed Sep. 29, 2022, naming inventors Pezeshiki et al.
U.S. Appl. No. 17/956,456, filed Sep. 29, 2022, naming inventors Pezeshiki.
U.S. Appl. No. 17/956,461, filed Sep. 29, 2022, naming inventors Pezeshiki.
U.S. Appl. No. 18/101,286, filed Jan. 25, 2023, naming inventors Hegardh.
U.S. Appl. No. 18/129,164, filed Mar. 31, 2023, naming inventors Hunn.
U.S. Appl. No. 18/129,194, filed Mar. 31, 2023, naming inventors Hunn.
U.S. Appl. No. 18/175,915, filed Feb. 28, 2023, naming inventors Jin.
U.S. Appl. No. 18/370,717, filed Sep. 20, 2023, naming inventors Pezeshiki.

\* cited by examiner

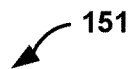

MASTER SUBSCRIPTION AND SERVICES AGREEMENT

This MASTER SUBSCRIPTION AND SERVICES AGREEMENT and any exhibits, attachments, Orders, SOWs, and other documents expressly entered into between the Parties referencing this MASTER SUBSCRIPTION AND SERVICES AGREEMENT (collectively, this "Agreement"), is made effective as of January 1st, 2000 ("Effective Date") between Acme, Inc. ("Acme"), a Delaware Corporation with offices at 123 Main Street, Boston, Massachusetts, 12345, and Zeta, Inc. ("Customer"), a Delaware Corporation with offices at 456 Main Street, San Francisco, California, 54321. Acme and Customer may be referred to herein individually as a "Party" and collectively as the "Parties." Acme and Customer hereby agree to the foregoing and as follows:

1. OVERVIEW.

1.1 Scope. Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

1.2 Orders. Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

1.3 Governing Law. This Agreement shall be governed by and construed under the laws of the State of California without regard to conflicts of law provisions. The exclusive forum and venue for any legal or equitable claim or action brought in connection with this Agreement shall be the state and federal courts situated in California.

1.4 Source of Reference. Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

1.5 Force Majeure. Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat..

1.6 Payment Terms. Acme shall invoice Customer, or automatically charge the credit card specified by Customer on the date of the applicable invoice, for the fees payable hereunder in accordance with the payment schedule of 60 days after the Effective Date.

FIG. 2A

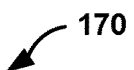

MASTER SUBSCRIPTION AND SERVICES AGREEMENT

This MASTER SUBSCRIPTION AND SERVICES AGREEMENT and any exhibits, attachments, Orders, SOWs, and other documents expressly entered into between the Parties referencing this MASTER SUBSCRIPTION AND SERVICES AGREEMENT (collectively, this "Agreement"), is made effective as of *<EFFECTIVE DATE>* ("Effective Date") between *<PARTY 1>*, a Delaware Corporation with offices at *<PARTY 1 ADDRESS STREET>*, *<PARTY 1 ADDRESS CITY>*, *<PARTY 1 ADDRESS STATE>*, *<PARTY 1 ADDRESS ZIP>*, and *<PARTY 2>*, a Delaware Corporation with offices at *<PARTY 2 ADDRESS STREET>*, *<PARTY 2 ADDRESS CITY>*, *<PARTY 2 ADDRESS STATE>*, *<PARTY 2 ADDRESS ZIP>*. *<PARTY 1>* and *<PARTY 2>* may be referred to herein individually as a "Party" and collectively as the "Parties." *<PARTY 1>* and *<PARTY 2>* hereby agree to the foregoing and as follows:

1.    OVERVIEW.

1.1    Scope.        Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

1.2    Orders.        Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

1.3    Governing Law.        This Agreement shall be governed by and construed under the laws of the State of *<STATE OF LAW>* without regard to conflicts of law provisions. The exclusive forum and venue for any legal or equitable claim or action brought in connection with this Agreement shall be the state and federal courts situated in *<STATE OF LAW>*.

1.4    Source of Reference.        Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

1.5    Force Majeure.        Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat..

1.6    Payment Terms.    Acme shall invoice Customer, or automatically charge the credit card specified by Customer on the date of the applicable invoice, for the fees payable hereunder in accordance with the payment schedule of *<PAYMENT TERM>* after the Effective Date.

FIG. 3A

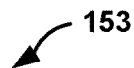
153

MASTER SUBSCRIPTION AND SERVICES AGREEMENT

This MASTER SUBSCRIPTION AND SERVICES AGREEMENT and any exhibits, attachments, Orders, SOWs, and other documents expressly entered into between the Parties referencing this MASTER SUBSCRIPTION AND SERVICES AGREEMENT (collectively, this "Agreement"), is made effective as of June 10, 2010 ("Effective Date") between Beta Inc. ("Beta"), a Delaware Corporation with offices at 10 Broad Street, Cincinnati, OH, 44444, and Gamma Inc. ("Gamma"), a Delaware Corporation with offices at 56 West 1st Avenue, Philadelphia, PA, 12121. Beta and Gamma may be referred to herein individually as a "Party" and collectively as the "Parties." Beta and Gamma hereby agree to the foregoing and as follows:

1.     OVERVIEW.

1.1     Scope.      Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

1.2     Orders.      Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

1.3     Governing Law.      This Agreement shall be governed by and construed under the laws of the State of Ohio without regard to conflicts of law provisions. The exclusive forum and venue for any legal or equitable claim or action brought in connection with this Agreement shall be the state and federal courts situated in Ohio.

1.4     Source of Reference.      Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

1.5     Force Majeure.      Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat..

1.6     Payment Terms.      Beta shall invoice Customer, or automatically charge the credit card specified by Customer on the date of the applicable invoice, for the fees payable hereunder in accordance with the payment schedule of 90 days after the Effective Date.

FIG. 4

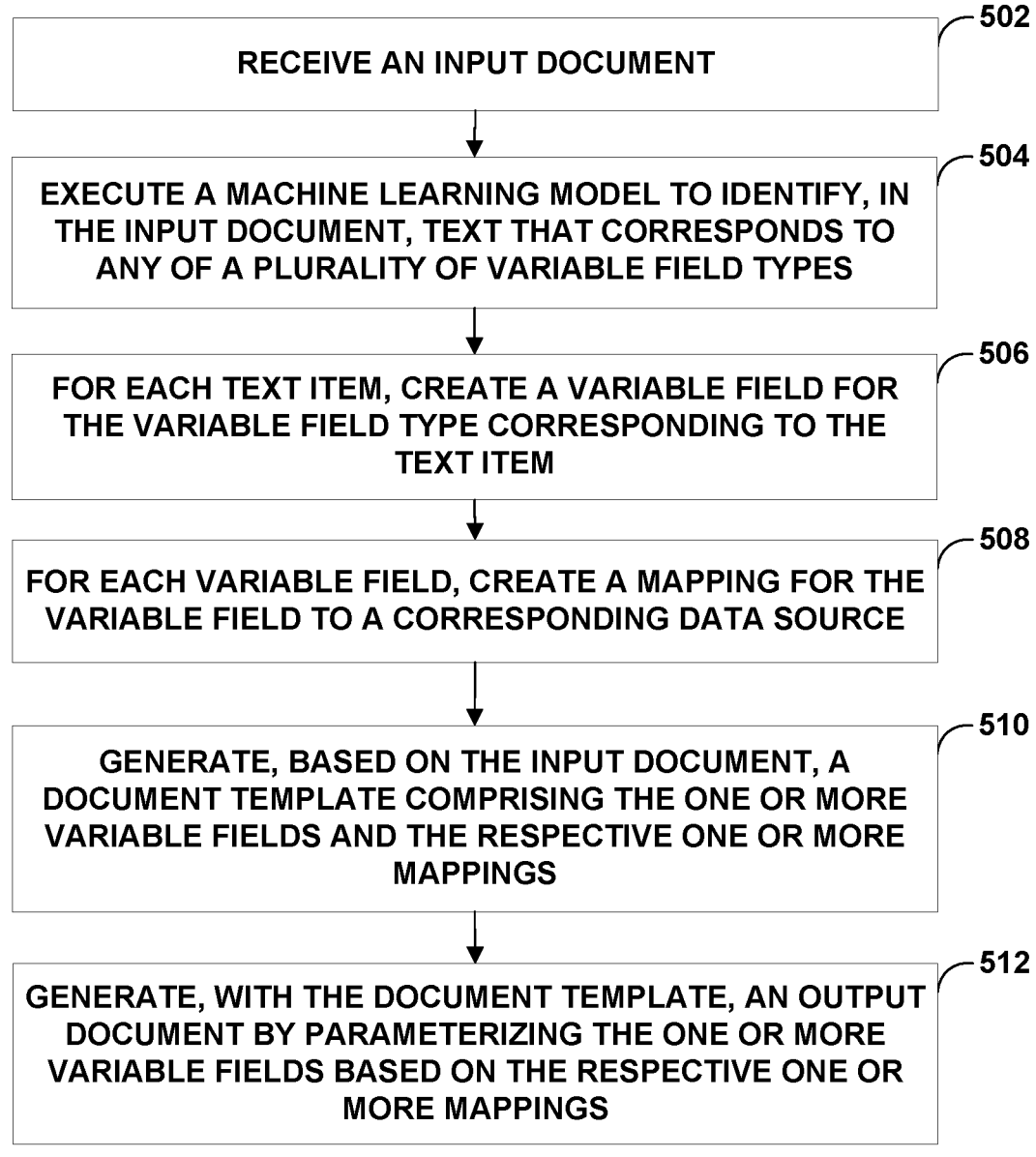

RECEIVE AN INPUT DOCUMENT ⌐502

EXECUTE A MACHINE LEARNING MODEL TO IDENTIFY, IN THE INPUT DOCUMENT, TEXT THAT CORRESPONDS TO ANY OF A PLURALITY OF VARIABLE FIELD TYPES ⌐504

FOR EACH TEXT ITEM, CREATE A VARIABLE FIELD FOR THE VARIABLE FIELD TYPE CORRESPONDING TO THE TEXT ITEM ⌐506

FOR EACH VARIABLE FIELD, CREATE A MAPPING FOR THE VARIABLE FIELD TO A CORRESPONDING DATA SOURCE ⌐508

GENERATE, BASED ON THE INPUT DOCUMENT, A DOCUMENT TEMPLATE COMPRISING THE ONE OR MORE VARIABLE FIELDS AND THE RESPECTIVE ONE OR MORE MAPPINGS ⌐510

GENERATE, WITH THE DOCUMENT TEMPLATE, AN OUTPUT DOCUMENT BY PARAMETERIZING THE ONE OR MORE VARIABLE FIELDS BASED ON THE RESPECTIVE ONE OR MORE MAPPINGS ⌐512

FIG. 5

DOCUMENT TEMPLATE GENERATION

TECHNICAL FIELD

This disclosure generally relates to electronic document management, and more specifically to machine learning for document creation.

BACKGROUND

Online document management systems are used for creating and reviewing documents for various entities (e.g., people, companies, organizations). Such electronic documents may include various types of agreements that can be executed (e.g., electronically signed) by entities, such as non-disclosure agreements, indemnity agreements, purchase orders, lease agreements, and employment contracts, etc. Online document management systems provide users with tools to edit, view, and execute the documents. Online document management systems are increasingly using cloud-based solutions that allow participants to perform collaborations based on online documents.

SUMMARY

In general, the disclosure describes techniques for generating a document template from document text of a document. The generated document templates may be used to generate new documents by merging data into variable fields identified from the document text. For example, a computing system as described herein executes a machine learning model trained to identify, in document text, text that corresponds to any of a plurality of variable field types. The computing system receives an input document and applies the machine learning model to process the input document to identify text items corresponding to respective variable field types of the plurality of variable field types. For each recognized text item, the computing system creates a variable field for the variable field type corresponding to the text item. Further, for each of the created variable fields, the computing system creates a mapping for the variable field to a corresponding data source.

The computing system generates, based on the input document, a document template comprising the created variable fields and the respective mappings. For example, the computing system may replace each instance of each identified text item within the input document with a variable field for the variable field type corresponding to instance of the text item to generate the document template. The computing system may thereafter use the mappings for the variable fields to the respective data sources to parameterize each variable field with a new text item of the corresponding variable field type to produce an output document.

The techniques of the disclosure may provide specific technical improvements to the computer-related field of electronic document management and document creation that have practical applications. For example, the techniques disclosed herein may enable a document management system to automatically identify probable dynamic data within document text and assist a user with converting, or in some cases autonomously convert, an input document into a document template having variable fields in place of the dynamic data. The document template may thereafter be usable to generate subsequent documents for use by different entities or in different scenarios by merging the variable fields with data from respective data sources mapped to the variable fields. A document management system as described herein may require only a single example of a document to rapidly prepare a document template for use by an entity. Therefore, the techniques of the disclosure may reduce the need for a technical expert to gather requirements of the entity (e.g., such as customer, business, legal, or other requirements) and comprehensively review multiple documents of a similar type to determine which portions of the documents are required to manually prepare the document template. Accordingly, the techniques of the disclosure may significantly reduce the time, expense, and labor required to prepare a document template useable for the generation of documents.

In one example, this disclosure describes a computing system comprising processing circuitry having access to a memory, the processing circuitry configured to: receive an input document; execute a machine learning model trained to identify, in document text, text that corresponds to any of a plurality of variable field types, the machine learning model configured to process the input document to identify one or more text items corresponding to respective variable field types of the plurality of variable field types; for each text item of the one or more text items, create a variable field for the variable field type of the plurality of variable field types corresponding to the text item; for each variable field of the one or more created variable fields, create a mapping for the variable field to a corresponding data source; and generate, based on the input document, a document template comprising the one or more created variable fields and the respective one or more mappings.

In another example, this disclosure describes a method comprising: receiving, by processing circuitry of a computing system, an input document; executing, by the processing circuitry, a machine learning model trained to identify, in document text, text that corresponds to any of a plurality of variable field types, the machine learning model configured to process the input document to identify one or more text items corresponding to respective variable field types of the plurality of variable field types; for each text item of the one or more text items, creating, by the processing circuitry, a variable field for the variable field type of the plurality of variable field types corresponding to the text item; for each variable field of the one or more created variable fields, creating, by the processing circuitry, a mapping for the variable field to a corresponding data source; and generating, by the processing circuitry and based on the input document, a document template comprising the one or more created variable fields and the respective one or more mappings.

In another example, this disclosure describes a non-transitory, computer-readable medium comprising instructions that, when executed, are configured to cause processing circuitry of a computing system to: receive an input document; execute a machine learning model trained to identify, in document text, text that corresponds to any of a plurality of variable field types, the machine learning model configured to process the input document to identify one or more text items corresponding to respective variable field types of the plurality of variable field types; for each text item of the one or more text items, create a variable field for the variable field type of the plurality of variable field types corresponding to the text item; for each variable field of the one or more created variable fields, create a mapping for the variable field to a corresponding data source; and generate, based on the input document, a document template comprising the one or more created variable fields and the respective one or more mappings.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIGS. 2A-2B are illustrations of an example input document that may be used to generate a document template in accordance with the techniques of the disclosure.

FIGS. 3A-3B are illustrations of an example document template generated in accordance with the techniques of the disclosure.

FIG. 4 is an illustration of an output document generated using a document template in accordance with the techniques of the disclosure.

FIG. 5 is a flowchart illustrating an example operation for generating a document template in accordance with the techniques of the disclosure.

Like reference characters refer to like elements throughout the figures and description.

DETAILED DESCRIPTION

Figure 1:
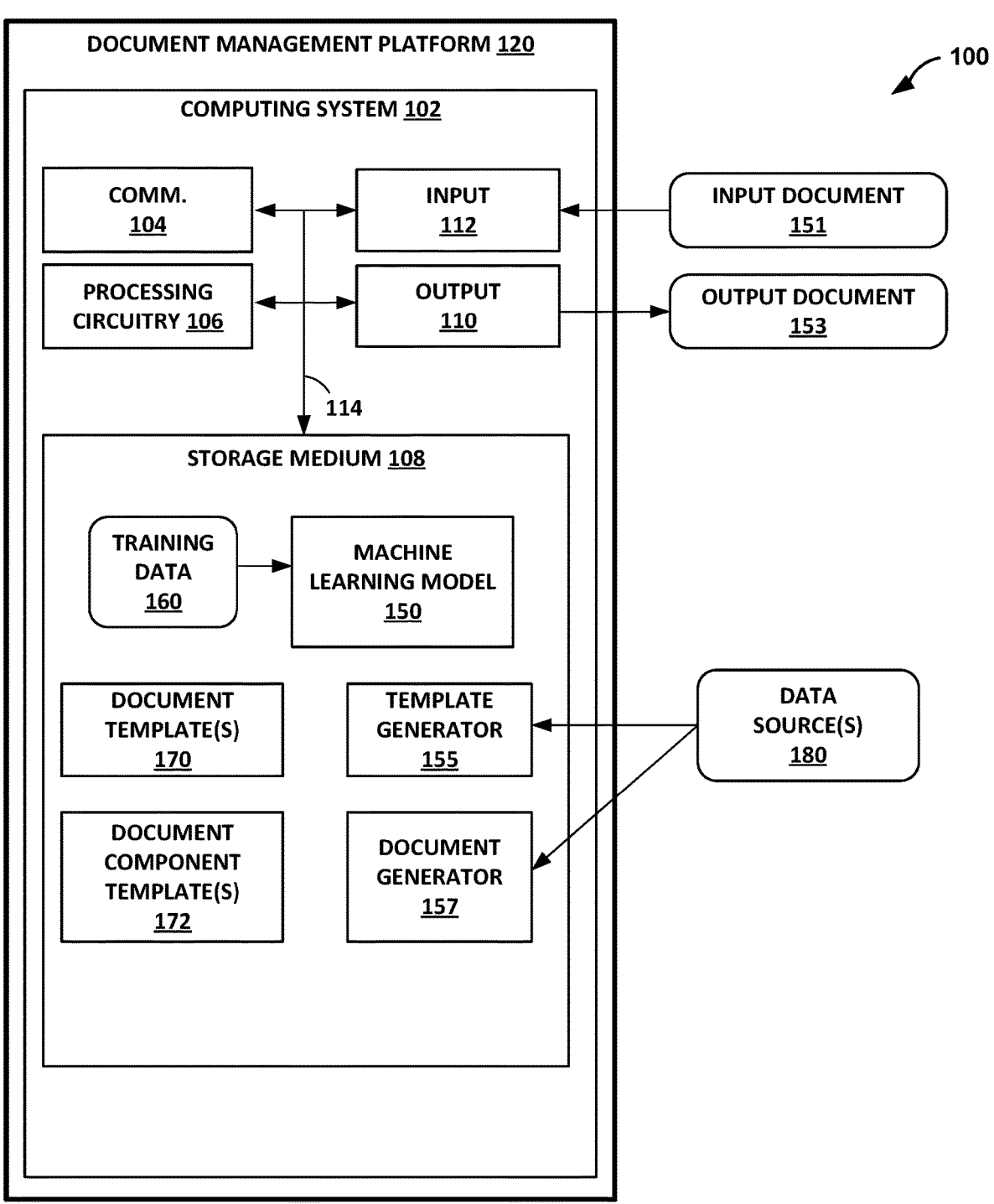
FIG. 1 is a block diagram illustrating an example system in accordance with the techniques of the disclosure.

FIG. 1 is a block diagram illustrating an example system 100 in accordance with the techniques of the disclosure. System 100 includes document management platform 120 implemented by computing system 102 and one or more data sources 180. As described in more detail below, in accordance with the techniques of the disclosure, document management platform 120 generates, from an input document 151, document template(s) 170, which in turn may be used to generate output document 153.

Computing system 102 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 102 represents a cloud computing system, server farm, and/or server cluster (or portion thereof) that provides services to other devices or systems. Computing system 102 may represent or be implemented through one or more virtual compute instances (e.g., virtual machines, containers) of a cloud computing system, server farm, data center, and/or server cluster.

In the example of FIG. 1, computing system 102 may include one or more communication units 104, one or more input devices 112, one or more output devices 110, processing circuitry 106, and storage medium 108. One or more of the devices, modules, storage areas, or other components of computing system 102 may be interconnected to enable inter-component communications (e.g., physically, communicatively, and/or operatively). In some examples, such connectivity may be provided by through communication channels (e.g., communication channels 114), which may represent one or more of a system bus, a network connection, an inter-process communication data structure, or any other method for communicating data.

Processing circuitry 106 of computing system 102 may implement functionality and/or execute instructions associated with computing system 102 or associated with one or more modules illustrated herein and/or described below.

Processing circuitry 106 may be, may be part of, and/or may include one or more hardware-based programmable processors and/or processing circuitry that performs operations in accordance with one or more aspects of the present disclosure. Examples of processing circuitry 106 include one or more microprocessors, application processors, display controllers, auxiliary processors, one or more sensor hubs, and any other hardware configured to function as a processor, a processing unit, or a processing device. Computing system 102 may use processing circuitry 106 to perform operations in accordance with one or more aspects of the present disclosure using software, hardware, firmware, or a mixture of hardware, software, and firmware residing in and/or executing at computing system 102.

One or more communication units 104 of computing system 102 may communicate with devices external to computing system 102 by transmitting and/or receiving data, and may operate, in some respects, as both an input device and an output device. In some examples, communication units 104 may communicate with other devices over a network. In other examples, communication units 104 may send and/or receive radio signals on a radio network such as a cellular radio network. In other examples, communication units 104 of computing system 102 may transmit and/or receive satellite signals on a satellite network. Examples of communication units 104 include, but are not limited to, a network interface card (e.g., such as an Ethernet card), an optical transceiver, a radio frequency transceiver, a GPS receiver, or any other type of device that can send and/or receive information. Other examples of communication units 104 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 112 may represent any input devices of computing system 102 not otherwise separately described herein. Input devices 112 may generate, receive, and/or process input. For example, one or more input devices 112 may generate or receive input from a network, a user input device, or any other type of device for detecting input from a human or machine.

One or more output devices 110 may represent any output devices of computing system 102 not otherwise separately described herein. Output devices 110 may generate, present, and/or process output. For example, one or more output devices 110 may generate, present, and/or process output in any form. Output devices 110 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

Processing circuitry 106 may provide an operating environment or platform for various modules described herein, which may be implemented as software, but may in some examples include any combination of hardware, firmware, and software. Processing circuitry 106 may execute instructions of one or more modules. Processing circuitry 106 may retrieve, store, and/or execute the instructions and/or data of one or more applications, modules, or software. Processing circuitry 106 may also be operably coupled to one or more other software and/or hardware components, including, but not limited to, one or more of the components of computing system 102 and/or one or more devices or systems illustrated as being connected to computing system 102.

Storage medium 108 represents one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data management platform 120. Different storage devices of storage medium 108 may have a different mix of types of storage media. Storage medium 108 may include system memory. Storage medium 108 may be a storage server, a network-attached storage (NAS) device, or may represent disk storage for a compute device. Storage medium 108 may be a redundant array of independent disks (RAID) system. In some examples, storage medium 108 comprises both compute and storage devices that execute software for data management platform 120, such as machine learning model 150, template generator 155, and document generator 157 as well as data storage for training data 160, document templates 170, and document component templates 172. Storage medium 108 may represent virtual machines running on a supported hypervisor, a cloud virtual machine, a physical rack server, or a compute model installed in a converged platform.

In the example of FIG. 1, document management platform 120 provides storage and management of documents or document packages for various users. Document management platform 120 includes machine learning model 150, training data 160, template generator 155, document generator 157, document templates 170, and document component templates 172. Document management platform 120 may include a collection of hardware devices, software components, and/or data stores that can be used to implement one or more applications or services provided to one or more client devices via a network. Document management platform 120 may perform functions relating to authoring, storage, and management of documents or document packages (e.g., envelopes) for various users.

Document management platform 120 provides authoring tools for creating and reviewing documents. Document management platform 120 provides users with tools to edit, view, and execute the documents. In some examples, document management platform 120 manages document templates 170 associated with documents. A document template 170 includes text of a document and variable fields that can be parameterized (e.g., replaced or filled in) with values for a specific use case for the document. Document management platform 120 stores document templates 170 received from users, generates new templates, and instantiates documents or portions of documents from document templates 170 by determining values of variable fields used in templates. For example, document generator 157 may parameterize a variable field of a document template 170 with a value such as a numeric value, a date value, an address, a textual clause, etc. obtained from data source 180, to produce an output document 153.

In some examples, storage medium 108 stores a set of document templates 172. Each document template comprises document text and a set of variable fields that may be parameterized with values specific to one or more entities (e.g., clients, customers, parties, enterprises, etc.). Examples of variable fields include agreement fields, clauses, obligations, verifications, actions, or other document components, but are not limited to these. Storage medium 108 stores a repository of document templates 170. Any of document templates 170 may be associated with a document type. The repository may store a set of versions of document templates 170 for each document type. A version of a document template is associated with a context determined based on various factors including, e.g., information describing a document workflow being executed by the document management platform 120 and information describing participants of the document workflow.

In some examples, storage medium 108 may further store a repository of document component templates 172. Document components may include portions or sub-portions of a document, such as, e.g., clauses, terms, provisions, or actions, etc. For example, a document template 170 may be formed from a plurality of document component templates 172. As an example, a document template 170 for a contract or agreement between two parties may be formed from document component templates 172 including templates for, e.g., a choice-of-law provision or a force majeure provision.

During a workflow, document management platform 120 selects a version of a document template 170 or a document component template 172 applicable to a particular context while executing a document workflow. Document management platform 120 receives information describing a current document workflow being executed. The current document workflow may have one or more participants. Document management platform 120 determines a current context based on the current document workflow and the participants of the current document workflow. Document management platform 120 identifies a document type relevant to the current document workflow and selects a version of a document template 170 (or document component template 172) of the document type. In some examples, document management platform 120 parameterizes one or more variable fields of the selected document template 170 (or document component template 172) with data obtained from data source 180 based on, for example, user input and/or feedback or automatic generation to produce output document 153.

In some examples, storage medium 108 stores different document templates 170 for use in different types of document workflows, for example, for different types of interactions between entities. For each document template 170, storage medium 108 may store multiple versions. For example, each version may be provided by a different entity for use in a particular context. Document management platform 120 may enable a user to perform searches for document templates 170, for example, using a keyword based interface or a natural language interface. In some examples, document management platform 120 may perform automatic searches based on a context determined by the document workflow.

Document management platform 120 may be configured to allow a sender to create and send documents to one or more recipients for negotiation, collaborative editing, electronic execution (e.g., electronic signature), automation of contract fulfilment, archival, and analysis, among other tasks. In one non-limiting example, a first user may be a sender of a document package (e.g., envelope) and a second user may be a recipient of the document package. Within the system environment, a recipient may review content or terms presented in a digital document, and in response to agreeing to the content or terms, can electronically execute the document. In some aspects, in advance of the execution of the documents, the sender may generate a document package to provide to the one or more recipients. The document package may include at least one document to be executed by one or more recipients. In some examples, the document package may also include one or more permissions defining actions the one or more recipients can perform in association with the document package. In some examples, the document package may also identify tasks the one or more recipients are to perform in association with the document package. In some examples, document management platform 120 may verify the identity of one or more recipients to perform one or more actions in relation to a document package, such as executing an agreement, accessing a document, modifying a document, or any other suitable action.

Document management platform 120 described herein may be implemented within a centralized document system, an online document system, a cloud-based document management system, an on-prem or workstation-based document management system, or any type of digital management platform. Although description may be limited in certain contexts to a particular environment, this is for the purposes of simplicity only, and in practice the principles described herein may apply more broadly to the context of any digital management platform. Examples may include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

The document management platform 120 may be located on premises and/or in one or more data centers, with each data center a part of a public, private, or hybrid cloud. The applications or services provided by document management platform 120 may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS, Platform-aaS, Infrastructure-aaS, Data Storage-aas (dSaaS), or other type of service.

Additional description with respect to a document management platform may be found in U.S. patent application Ser. No. 17/956,448, entitled "Discovery Of Document Templates In A Document Management System," filed Sep. 29, 2022, the entire content of which is incorporated herein by reference.

Data source 180 makes accessible to computing system 102 data that may be used to parameterize one or more variable fields of document templates 170 and document component templates 172. Data source 180 may include storage media that stores data used to complete variable fields document templates 170. Data source 180 may be part of computing system 102, accessible locally to computing system 102, or accessible to computing system 102 via a network. Data source 180 may be a service provided by an application platform, such as a cloud service provided by an application executing in a cloud-based computing system deployed by a cloud service provider. Data source 180 may represent multiple sources of data.

Data source 180 may include multiple tables or other associative data structure. The associative data structure may include multiple different fields or columns that stores different values, in respective records (or "entries"), for a given variable field. Based on a key or index for a record, the associative data structure may be queried to obtain a value for a field for the record. In some examples, data store 180 is a database of entity, business, sales, and/or customer information. Data source 180 includes respective entries for a plurality of entities, each entry including one or more values specific to the corresponding entity for each column of data stored by data source 180. For example, an entry for an entity may include values for one or more columns including, e.g., an entity name, an entity address, a state of governing law, a governing body of law, a purchase order, a per-unit purchase price, an amount of purchased units, a payment term, an effective date of the document, a termination date of the document, etc.

As described above, once document templates 170 are created, document generator 157 may use document templates 170 to rapidly prepare a final document, such as output document 153. However, conventionally, the initial preparation of the document template itself may be a laborious, time-consuming matter. For example, a document template may conventionally be prepared by a technical expert manually during a process whereby the document template is customized for use by a specific entity. To prepare the document template, the technical expert may conventionally be required to conduct an exhaustive interview of the entity to determine business needs, typical use of the document, as well as a tolerance for risk of the entity. Thereafter, the technical expert may conventionally be required to review numerous examples of the desired document to determine which portions of the document remain consistent across different scenarios and/or parties, and which portions of the document change across such scenarios and/or parties. Only after understanding the document, the context within which it was written and within which subsequent, similar documents may be used, and the entity's needs, may the technical expert begin to prepare the document template. Once the technical expert has sufficient information to prepare the document template, the technical expert may need to select a document, identify relevant portions of text within the document, and replace the portions of text with variable fields, which may subsequently be used to parameterize the template to generate new documents. This may present a significant upfront burden to the entity in terms of time, effort, and cost when deciding whether to use document management platform 120 to author a document.

In accordance with the techniques of the disclosure, template generator 155 of document management platform 120 uses machine learning model 150 to process input document 151 to automatically identify probable dynamic data within input document 151 text and assist a user with generating, or in some cases autonomously generating, one or more document templates 170 from existing input document 151. Therefore, a document management platform as described herein may reduce the substantial burden in preparing document templates 170 and streamline the process of generating document templates for document generation.

Document management platform 120 executes machine learning model 150, which is trained to identify, in document text of one or more documents, text that corresponds to any of a plurality of variable field types, which indicates that the text is probable dynamic data that may correspond to a new variable field in a new document template. In various aspects, machine learning model 150 is implemented as any classifier or detector, such as a model-based classifier or a learned classifier (e.g., classifier based on machine learning). For learned classifiers, binary or multiclass classifiers may be used, such as Bayesian, boosting or neural network classifiers. In one aspect, the machine learning model may be a machine-trained probabilistic boosting tree. Such classifier may be constructed as a tree structure. The machine-trained probabilistic boosting tree may be trained from a training data set (training data 160). In some examples, machine learning model 150 is part of or may include a neural network, such as one or more of a Deep Neural Network (DNN) model, Recurrent Neural Network (RNN) model, and/or a Long Short-Term Memory (LSTM) model. In general, DNNs and RNNs learn from data available as feature vectors, and LSTMs learn from sequential data. In some examples, machine learning model 150 comprises a large language model (LLM) and/or is configured to perform natural language processing of one or more documents.

In some examples, a machine learning system separate from document management platform 120 may be used to train machine learning model 150. The machine learning system may be executed by a computing system having hardware components similar to those described with respect to computing system 102. Such a machine learning system may apply other types of machine learning to train machine learning model 150. For example, the machine learning system may apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train machine learning model 150.

Machine learning model 150 processes training data 160 for training machine learning model 150, data for prediction, or other data. In some examples, machine learning model 150 is trained with training data 160. Training data 160 may comprise, for example, a plurality of documents, each document including one or more text items labeled with a corresponding variable field type. Training data 160 may further comprise, for example, a plurality of document components, such as clauses, actions, etc., that are labeled with a corresponding document component type. Training data 160 may contain a large collection of labeled (classified) samples. In some examples, machine learning model 150 is trained using supervised, unsupervised, self-supervised, or reinforcement learning techniques. In some examples, computing system 102 trains machine learning model 150. In some examples, computing system 102 obtains and applies machine learning model 150 that has been trained by another system. Machine learning model 150 may in this way be trained to identify, in document text of one or more documents, text that corresponds to any of a plurality of variable field types, which indicates that the text is probable dynamic data that may correspond to a new variable field in a new document template.

As an illustrative example of the techniques of the disclosure, document management platform 120 receives input document 151. In some examples, input document 151 is an agreement, contract, or purchase order, etc. In some examples, document management platform 120 provides a user interface which enables a user to upload input document 151 to document management platform 120.

Machine learning model 150 of document management platform 120 processes input document 151 to identify one or more text items corresponding to respective variable field types of a plurality of variable field types. In general, a variable field type is a descriptor of the type of variable field identified by machine learning model 150. Machine learning model 150 is trained to predict, from document text, whether a set of one or more words or other string of characters is a variable field type and outputs an indication of the predicted variable field type. As described above, machine learning model 150 may be trained to identify such variable field types with training data 160 comprising one or more text items and labels, for each of the one or more text items, which specify a variable field type represented by the corresponding text item. The variable field types may include, for example, one or more agreement field types, clause types, or obligation types. For example, machine learning model 150 identifies, in input document 151, the text item "Acme, Inc. ('Acme')," and machine learning model 150 predicts that this text item relates to a "party name" variable field type. As another example, machine learning model 150 identifies, in input document 151, the text item "California" is predicted to relate to a "state of governing law" type variable field type. As yet another example, machine learning model 150 identifies, in input document 151, a body of text predicted to relate to a "force majeure" clause variable field type.

In some examples, document management platform 120 provides a user interface which displays a representation of input document 151. Document management platform 120 may provide, via the user interface, one or more prompts to a user to confirm that (1) each text item recognized within input document 151 has been correctly identified by machine learning model 150; and (2) each text item recognized within input document 151 has been predicted, and optionally labeled, with a correct variable field type. In some examples, the user interface enables the user to adjust each recognized text item to incorporate more or less text of input document 151, or to define a new text item which includes text of input document 151 selected by the user. In some examples, the user interface enables the user to define a new variable field type and/or correct the predicted variable field type for a particular text item.

For each text item of the one or more text items, template generator 155 creates a variable field for the variable field type corresponding to the text item. For each variable field of the one or more created variable fields, template generator 155 creates a mapping for the variable field to a corresponding data source 180. The mapping for each variable field describes a relationship between the variable field and, for instance, a column of a corresponding data source 180, the column corresponding to the variable field type of the corresponding text item and identifying values for a set of entities within data source 180. In some examples, document management platform 120 provides a user interface that prompts a user to specify a data source 180 and respective columns to be used for one or more of the variable fields. Reference to "columns" of data source 180 herein includes different objects, fields, record set, and/or data sources having multiple values that can be identified using a key identifier, for instance.

With respect to the foregoing example, for the "party name" variable field type, template generator 155 creates a <PARTY NAME> variable field and a mapping to a "party name" column of data source 180. For the "state of governing law" variable field type, template generator 155 creates a <STATE OF LAW> variable field and a mapping to a "state of governing law" column of data source 180. For the "force majeure" clause variable field type, template generator 155 creates a <FORCE MAJEURE> variable field and a mapping to a "force majeure" column of data source 180.

Template generator 155 generates, based on input document 151, document template 170 comprising the one or more created variable fields and the respective one or more mappings. For example, for each recognized text item of input document 151, template generator 155 replaces the text item with the corresponding variable field and stores the mapping for the variable field to the corresponding data source 180. With respect to the foregoing example, template generator 155 replaces the text item "Acme, Inc." with the <PARTY NAME> variable field; the text item "California" with the <STATE OF LAW> variable field; and the body of text that relates to the "force majeure" clause variable field type with the <FORCE MAJEURE> variable field. Furthermore, template generator 155 stores the corresponding mapping for each of the one or more created variable fields. Typically, each variable field inserted within document template 170 is a text string descriptive of the corresponding variable field type of the plurality of variable field types.

Input document 151 typically includes additional text not corresponding to any of the plurality of variable field types. Such additional text may be considered to be constant or consistent across the same type of document regardless of context or party to which the document relates. Such additional text which remains constant is contrasted with text that varies across different contexts or parties (e.g., wherein such variable text is represented as variable fields within document template 170). Template generator 155 typically reproduces or incorporates such additional, constant text of input document 151 within document template 170, while replacing the variable content of input document 151 with variable fields within document template 170 as described above.

In some examples, template generator 155 stores the completed document template 170. For example, template generator 155 stores the completed document template 170 in a repository of document templates. In some examples, document management platform 120 maintains a repository or database of a plurality of different document types, with one or more document templates 170 for each document type.

Document generator 157 produces, with document template 170, output document 153 by parameterizing, based on the respective one or more mappings of document template 170, the one or more created variable fields of document template 170 with the corresponding one or more data sources. For example, document generator 157 replaces each variable field within document template 170 with text obtained from a column of an entry of a corresponding data source 180. In some examples, the entry may be identified with input received from a user indicating one or more entities to which output document 153 relates, and the column is identified based on the corresponding mapping for the variable field.

In some examples, the "party name" and "state of governing law" variable field types may map directly to values of an entry within data source 180 corresponding to respective columns of data source 180. In contrast, the "force majeure" clause variable field type may instead map to one or more document component templates 172, such as one or more templates for a "force majeure" clause. The mapping between the "force majeure" clause variable field type and data source 180 may indicate a particular template for a "force majeure" clause to be used by an entity to which output document 153 relates.

In some examples, document management platform 120 provides a user interface which enables a user to define custom mappings between a variable field and data source 180. For example, the user interface may enable a user to define one or more rules, functions, queries, or logic which may be applied to the variable field to select a corresponding value from data source 180. In addition, the user interface may enable a user to define criteria for displaying the variable field once parameterized, such as incorporating table elements, or performing mathematical operations with respect to other variable field elements. For example, the user interface may enable a user to specify that a <UNIT PRICE> variable field and a <UNIT VOLUME> variable field should be multiplied together to represent, e.g., a total sale price of the units. The mapping between variable field and data source 180 may identify the data source using one or more of identifier for the data source, a resource locator, a website, a database query or structured query, a RESTful API resource identifier, a column/field name, or other information by which document generator 157 may obtain values for the variable field. The mapping may be used as a lookup whereby data source 180 is queried for a value for the mapped variable field, the value being for a particular record sourced by data source 180 and identified using a lookup key.

In the foregoing example, document management platform 120 includes both template generator 155, which generates document template 170 from input document 151, and document generator 157, which generates output document 153 from document template 170. However, in some examples, different systems may be used to generate document templates and to generate output documents from document templates. For example, document templates may be generated by computing system 102 and exported for use by different computing systems in generating output documents.

Accordingly, the template generator 157 of document management platform 120 described herein may leverage AI, such as machine learning model 150, to automatically identify dynamic document data, such as a counterparty, a total contract value, a state of law, etc., within an input document 151 and convert such data to variable fields based on inputs and validations from the user. Furthermore, the document management platform 120 described herein may aid users in navigating through a document and provide, to users, prompts to create document template 170 to facilitate automated document creation. The document management platform 120 described herein may allow legal users, contract managers, and document administrators to create document templates 170 for documents, such as contracts, agreements, and purchase orders. As described above, template generator 157 of document management platform 120 may use machine learning model 150 to analyze documents and identify variable fields such as agreement fields, clauses, and obligations, which may otherwise be required to be performed manually by a technical expert. The document management platform 120 described herein may enable a user to validate and adjust suggestions provided by machine learning model 150 to complete the setup of document template 170. In this fashion, a document management platform 120 as described herein may streamline the creation process of document templates 170.

Figure 2B:
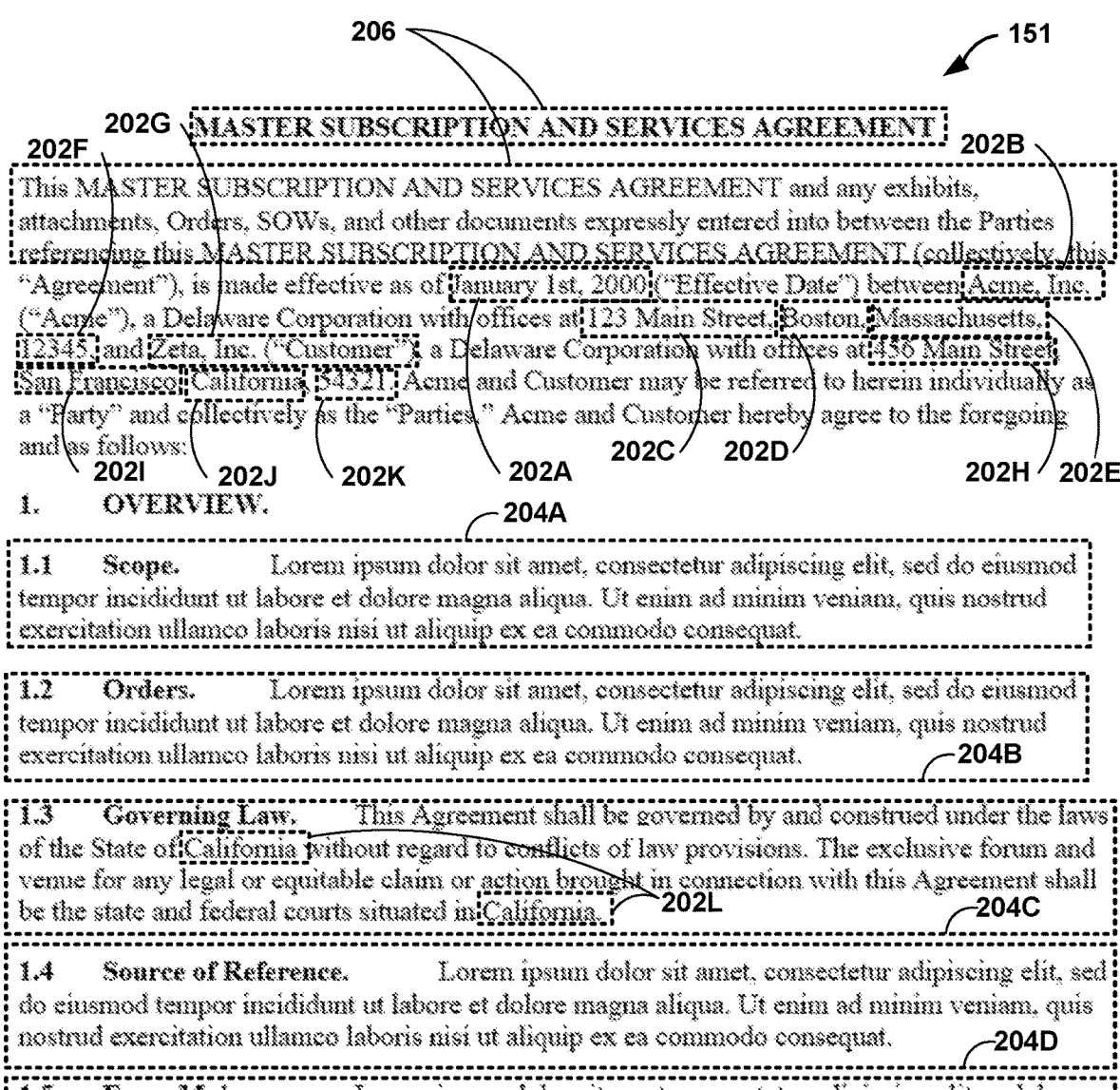

FIGS. 2A-2B are illustrations of example input document 151 that may be used to generate a document template in accordance with the techniques of the disclosure. Input document 151 of FIGS. 2A-2B may be an example of input document 151 of FIG. 1. For convenience, input document 151 is described with respect to system 100 of FIG. 1.

Document management platform 120 receives input document 151 of FIG. 2A. As described above with respect to FIG. 1, template generator 157 applies machine learning model 150 to input document 151 to identify one or more text items, such as agreement fields, clauses, or obligations, present within input document 151.

FIG. 2B depicts input document 151, annotated to depict the text items identified by machine learning model 150. The text items identified by machine learning model 150 include one or more agreement fields, including an effective date 202A of input document 151 (e.g., "Jan. 1, 2000"), a first party name 202B (e.g., "Acme, Inc."), a street address 202C of the first party (e.g., "123 Main Street"), a city 202D of the first party (e.g., "Boston"), a state 202E of the first party (e.g., "Massachusetts"), a zip code 202F of the first party (e.g., "12345"), a second party name 202G ("Zeta, Inc."), a street address 202H of the second party (e.g., "456 Main Street"), a city 2021 of the second party (e.g., "San Francisco"), a state 202J of the second party (e.g., "California"), a zip code 202K of the second party (e.g., "54321"), a state of governing law 202L of input document 151 (e.g., "California"), and a payment term 202M of input document 151 (e.g., "60 days"). The text items further identified by machine learning model 150 include one or more clauses 204A-204F (hereinafter, "clauses 204"). As examples, the identified clauses 204 include scope clause 204A, orders clause 204B, governing law clause 204C, source of reference clause 204D, force majeure clause 204E, and payment term clause 204F.

Figure 3B:
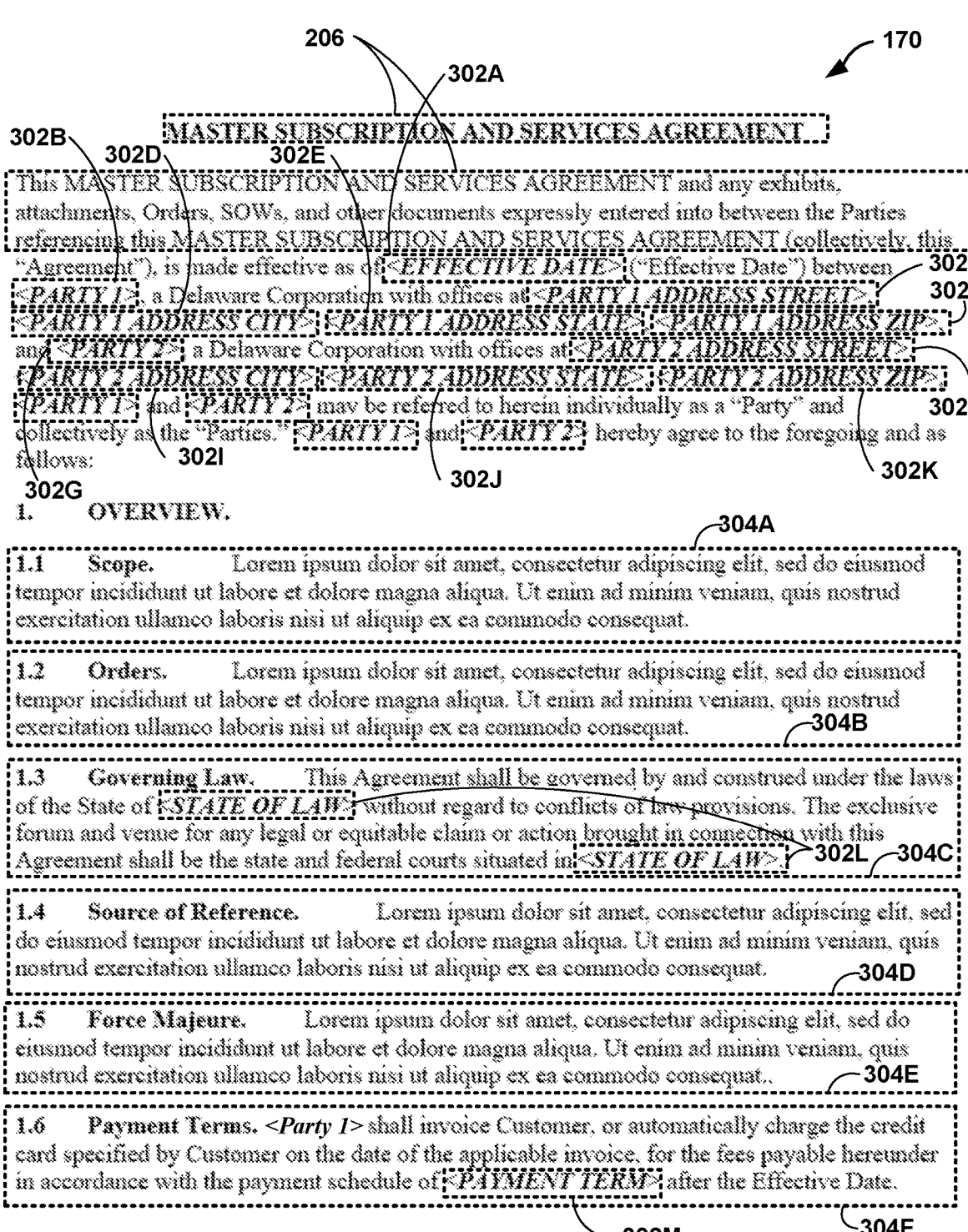

FIGS. 3A-3B are illustrations of example document template 170 generated in accordance with the techniques of the disclosure. Document template 170 of FIGS. 3A-3B may be an example of document template 170 of FIG. 1. For convenience, document template 170 is described with respect to system 100 of FIG. 1.

As described above with respect to FIG. 1, document management platform 120 obtains document template 170 of FIG. 3A by replacing the text items of input document 151 of FIGS. 2A-2B with one or more variable fields corresponding to a variable field type of the corresponding text item of input document 151. Furthermore, template generator 157 creates a mapping for each variable field to a corresponding data source 180.

FIG. 3B depicts document template 170, annotated to depict the variable fields of document template 170. The variable fields inserted into input document 151 correspond to one or more variable field types. The one or more variable fields include one or more agreement fields, including an effective date field 302A, a first party name field 302B, a first party street address field 302C, a first party city field 302D, a first party state field 302E, a first party zip code field 302F, a second party name field 302G, a second party street address field 302H, a second party city field 302I, a second party state field 302J, a second party zip code field 302K, a state of governing law field 302L, and a payment term field 302M. The variable fields further include one or more clause fields 304A-304F (hereinafter, "clause fields 304"). As examples, the identified clause fields 304 include scope clause field 304A, orders clause field 304B, governing law clause field 304C, source of reference clause field 304D, force majeure clause field 304E, and payment term clause field 304F.

As depicted above with respect to FIG. 2B above, input document 151 is further annotated with additional text 206 not corresponding to any of the plurality of variable field types. Such additional text 206 may be considered to be constant or consistent across the same type of document regardless of context or party to which the document relates. Such additional text 206, which remains constant, is contrasted with text that varies across different contexts or parties (e.g., wherein such variable text is represented as variable fields within document template 170), such as text items 202A-202M and clauses 204 of FIG. 2B. As depicted above with respect to FIG. 3B, template generator 155 typically reproduces or incorporates such additional, constant text 206 of input document 151 within document template 170, while replacing the variable content (e.g., text items 202A-202M and clauses 204 of FIG. 2B) of input document 151 with respective variable fields (e.g., agreement fields 302A-302M and clause fields 304 of FIG. 3B) within document template 170, as described above.

FIG. 4 is an illustration of output document 153 generated using document template 170 in accordance with the techniques of the disclosure. Output document 153 of FIG. 4 may be an example of output document 153 of FIG. 1. For convenience, output document 153 is described with respect to system 100 of FIG. 1. As described above, document generator 157 parameterizes the variable fields of document template 170 of FIGS. 3A-3B with values of entries of data source 180 based on the mappings between the variable fields to columns of data source 180 to obtain output document 153 of FIG. 4.

FIG. 5 is a flowchart illustrating an example operation for generating a document template in accordance with the techniques of the disclosure. For convenience, FIG. 5 is described with respect to system 100 of FIG. 1.

Document management platform 120 receives input document 151 (502). In some examples, input document 151 is an agreement, contract, purchase order, or the like. In some examples, document management platform 120 provides a user interface which enables a user to upload input document 151 to document management platform 120.

Document management platform 120 executes machine learning model 150, which is trained to identify, in document text of one or more documents, text that corresponds to any of a plurality of variable field types. For example, machine learning model 150 processes input document 151 to identify one or more text items corresponding to respective variable field types of a plurality of variable field types (504). For each text item of the one or more text items, template generator 157 creates a variable field for the variable field type corresponding to the text item (506). For each variable field of the one or more created variable fields, template generator 157 creates a mapping for the variable field to a corresponding data source 180 (508).

Template generator 157 generates, based on input document 151, document template 170 comprising the one or more created variable fields and the respective one or more mappings (510). For example, for each recognized text item of input document 151, template generator 157 replaces the text item with the corresponding variable field and stores the mapping for the variable field to the corresponding data source 180. Furthermore, template generator 157 stores the corresponding mapping for each of the one or more created variable fields.

Document generator 157 optionally generates, with document template 170, output document 153 by parameterizing, based on the respective one or more mappings of document template 170, the one or more created variable fields of document template 170 with the corresponding one or more data sources (512). For example, document generator 157 replaces each variable field within document template 170 with text obtained from a column of an entry of data source 180, In some examples, the entry may be identified with input received from a user indicating one or more entities to which output document 153 relates, and the column is identified based on the corresponding mapping for the variable field.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising processing circuitry having access to a memory, the processing circuitry configured to:

receive an electronic input document;

process, with a machine learning model, the electronic input document to identify one or more first text items corresponding to respective variable field types of a plurality of variable field types, wherein the machine learning model is trained, with a plurality of labeled electronic documents, to identify, in document text, text that corresponds to any of the plurality of variable field types, wherein each of the plurality of labeled electronic documents includes one or more second text items labeled with a corresponding variable field type of the plurality of variable field types;

for each text item of the one or more first text items identified within the electronic input document, create a variable field for the variable field type of the plurality of variable field types corresponding to the text item;

for each variable field of the one or more created variable fields, create a mapping for the variable field to a corresponding electronic data source;

generate, based on the electronic input document, an electronic document template comprising at least a portion of document text of the electronic input document, the one or more created variable fields and, for each variable field of the one or more created variable fields, the mapping for the variable field to the corresponding electronic data source, wherein the mapping comprises data identifying the corresponding electronic data source; and parameterize, based on the corresponding mapping, each variable field of the one or more created variable fields of the electronic document template with data from the corresponding electronic data source to generate an electronic output document.

2. The computing system of claim 1, wherein the electronic output document comprises the at least a portion of document text of the electronic input document.

3. The computing system of claim 2, wherein the data from the corresponding electronic data source comprises text.

4. The computing system of claim 1, wherein to generate, based on the electronic input document, the electronic document template, the processing circuitry is configured to:

for each text item of the one or more first text items identified within the electronic input document, replace the text item within the electronic input document with the corresponding variable field of the one or more created variable fields.

5. The computing system of claim 1, wherein the at least a portion of document text of the electronic input document does not correspond to any of the plurality of variable field types.

6. The computing system of claim 1, wherein the plurality of variable field types comprise one or more of an agreement field, a clause, or an obligation.

7. The computing system of claim 1, wherein the plurality of variable field types comprise one or more of a name, an address, a state of governing law, a payment term, an effective date, or a termination date.

8. The computing system of claim 1, wherein a variable field type of the plurality of variable field types comprises an entity name, wherein to identify the one or more first text items, the machine learning model is configured to identify a text item of the one or more first text items corresponding to the entity name, the text item comprising a first name of an entity, and wherein the processing circuitry is configured to create a mapping, for the variable field of the one or more variable fields corresponding to the first name of the entity, comprising data identifying a column of the corresponding electronic data source, the column comprising entity names for a set of entities.

9. The computing system of claim 1, wherein the processing circuitry is further configured to store the electronic document template in a database comprising a plurality of electronic document templates.

10. The computing system of claim 1, wherein each variable field of the one or more created variable fields comprises a text string descriptive of the corresponding variable field type of the plurality of variable field types.

11. A method comprising:

receiving, by processing circuitry of a computing system, an electronic input document;

processing, with a machine learning model executed by the processing circuitry, the electronic input document to identify one or more first text items corresponding to respective variable field types of a plurality of variable field types, wherein the machine learning model is trained, with a plurality of labeled electronic documents, to identify, in document text, text that corresponds to any of the plurality of variable field types, wherein each of the plurality of labeled electronic documents includes one or more second text items labeled with a corresponding variable field type of the plurality of variable field types;

for each text item of the one or more first text items identified within the electronic input document, creating, by the processing circuitry, a variable field for the variable field type of the plurality of variable field types corresponding to the text item;

for each variable field of the one or more created variable fields, creating, by the processing circuitry, a mapping for the variable field to a corresponding electronic data source;

generating, by the processing circuitry and based on the electronic input document, an electronic document template comprising at least a portion of document text of the electronic input document, the one or more created variable fields and, for each variable field of the one or more created variable fields, the mapping for the variable field to the corresponding electronic data source, wherein the mapping comprises data identifying the corresponding electronic data source; and parameterize, by the processing circuitry and based on the corresponding mapping, each variable field of the one or more created variable fields of the electronic document template with data from the corresponding electronic data source to generate an electronic output document.

12. The method of claim 11, wherein the electronic output document comprises the at least a portion of document text of the electronic input document.

13. The method of claim 11, wherein the data from the corresponding electronic data source comprises text.

14. The method of claim 11, wherein generating, based on the electronic input document, the electronic document template comprises:

for each text item of the one or more first text items identified within the electronic input document, replacing the text item within the electronic input document with the corresponding variable field of the one or more created variable fields.

15. The method of claim 11, wherein the at least a portion of document text of the electronic input document does not correspond to any of the plurality of variable field types.

16. The method of claim 11, wherein the plurality of variable field types comprise one or more of an agreement field, a clause, or an obligation.

17. The method of claim 11, wherein the plurality of variable field types comprise one or more of a name, an address, a state of governing law, a payment term, an effective date, or a termination date.

18. The method of claim 11, wherein a variable field type of the plurality of variable field types comprises an entity name, wherein identifying the one or more first text items comprises identifying a text item of the one or more first text items corresponding to the entity name, the text item comprising a first name of an entity, and wherein the method further comprises creating, by the processing circuitry, a mapping, for the variable field of the one or more variable fields corresponding to the first name of the entity, comprising data identifying a column of the corresponding electronic data source, the column comprising entity names for a set of entities.

19. The method of claim 11, wherein each variable field of the one or more created variable fields comprises a text string descriptive of the corresponding variable field type of the plurality of variable field types.

20. A non-transitory, computer-readable medium comprising instructions that, when executed, are configured to cause processing circuitry of a computing system to:

receive an electronic input document;

process, with a machine learning model, the electronic input document to identify one or more first text items corresponding to respective variable field types of a plurality of variable field types, wherein the machine learning model is trained, with a plurality of labeled electronic documents, to identify, in document text, text that corresponds to any of the plurality of variable field types, wherein each of the plurality of labeled electronic documents includes one or more second text items labeled with a corresponding variable field type of the plurality of variable field types;

for each text item of the one or more first text items identified within the electronic input document, create a variable field for the variable field type of the plurality of variable field types corresponding to the text item;

for each variable field of the one or more created variable fields, create a mapping for the variable field to a corresponding electronic data source;

generate, based on the electronic input document, an electronic document template comprising at least a portion of document text of the electronic input document, the one or more created variable fields and, for each variable field of the one or more created variable fields, the mapping for the variable field to the corresponding electronic data source, wherein the mapping comprises data identifying the corresponding electronic data source; and parameterize, based on the corresponding mapping, each variable field of the one or more created variable fields of the electronic document template with data from the corresponding electronic data source to generate an electronic output document.

\* \* \* \* \*